United States Patent
Kushida et al.

(10) Patent No.: US 7,537,362 B2
(45) Date of Patent: May 26, 2009

(54) VEHICULAR LIGHTING SYSTEM

(75) Inventors: Kazumitsu Kushida, Saitama (JP); Yoshiyuki Matsumoto, Saitama (JP); Yutaka Murata, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 282 days.

(21) Appl. No.: 11/405,682

(22) Filed: Apr. 17, 2006

(65) Prior Publication Data

US 2006/0232987 A1 Oct. 19, 2006

(30) Foreign Application Priority Data

Apr. 18, 2005 (JP) ............... 2005-119789

(51) Int. Cl.
*B62J 6/00* (2006.01)
(52) U.S. Cl. .............. 362/473; 362/474; 362/475; 362/476; 362/498; 362/499; 296/77.1; 296/78.1
(58) Field of Classification Search ............ 362/29, 362/473–476, 498, 499, 478, 538; 296/77.1, 296/78.1
See application file for complete search history.

(56) References Cited

U.S. PATENT DOCUMENTS

| 5,984,497 | A | 11/1999 | Foerstner et al. | |
| 6,107,916 | A | 8/2000 | Beck et al. | |
| 2003/0142502 | A1* | 7/2003 | Kawai | 362/475 |
| 2003/0189819 | A1* | 10/2003 | Furuya | 362/26 |
| 2004/0264204 | A1* | 12/2004 | Toyofuku | 362/473 |
| 2006/0023462 | A1* | 2/2006 | Uemoto et al. | 362/475 |
| 2006/0125615 | A1* | 6/2006 | Song | 340/463 |

FOREIGN PATENT DOCUMENTS

| DE | 891 510 | 9/1953 |
| DE | 19652159 | 6/1998 |
| DE | 19739173 | 3/1999 |
| DE | 10118687 | 10/2002 |
| DE | 10355023 | 12/2004 |
| JP | 11-243538 | 9/1999 |
| JP | 2001-334976 | 12/2001 |

* cited by examiner

*Primary Examiner*—Sharon E Payne
*Assistant Examiner*—Mary Zettl
(74) *Attorney, Agent, or Firm*—Carrier, Blackman & Associates, P.C.; Joseph P. Carrier; William D. Blackman

(57) ABSTRACT

A vehicular lighting system that enhances motorcycle visibility is provided. Vehicle front headlights, arranged so as to be laterally symmetrical, are formed in a shape of eyes capable of evoking a face. A headlight includes a circular main light forming a pupil portion, an annular ring forming an iris portion, plates each forming a sclera portion (white of eye), an upper frame forming the contour of an upper eyelid portion, and a lower frame forming the contour of a lower eyelid portion. When the main light and the plates are made to emit light, and the ring is non-light emitting, the pupil portion and the sclera portion are clearly discriminated from each other, thus enabling recognition as "eyes" not only in the daytime but also in the nighttime. The light emitting portions may be set as the main light, the upper frame and the lower frame, and the like.

20 Claims, 12 Drawing Sheets

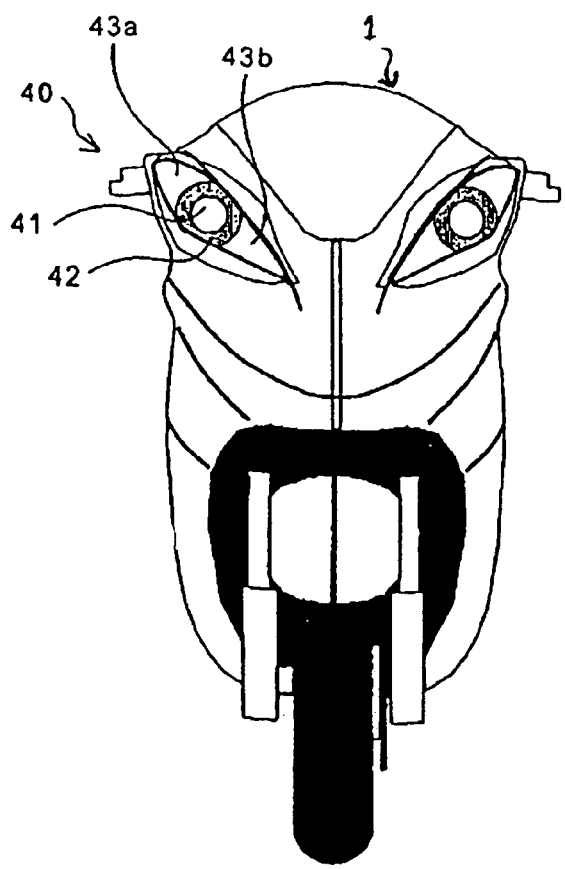
FIG. 4 (a)
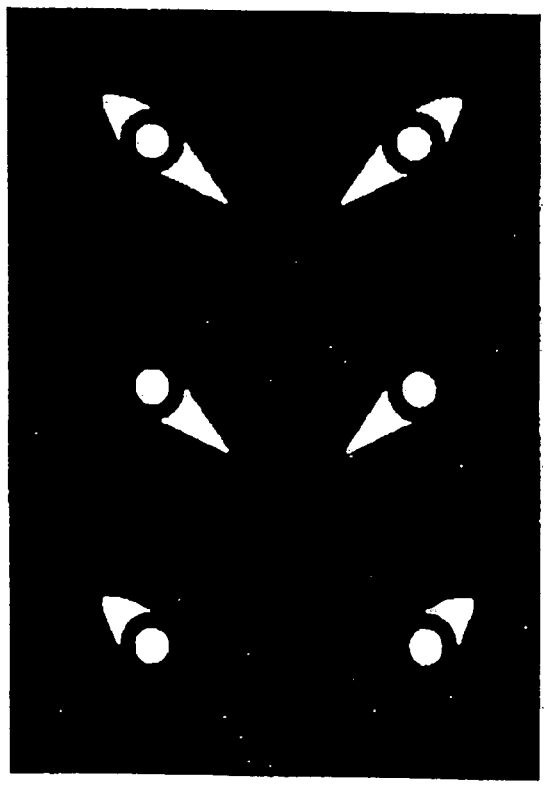
FIG.4 (b)
FIG.4 (c)
FIG.4 (d)

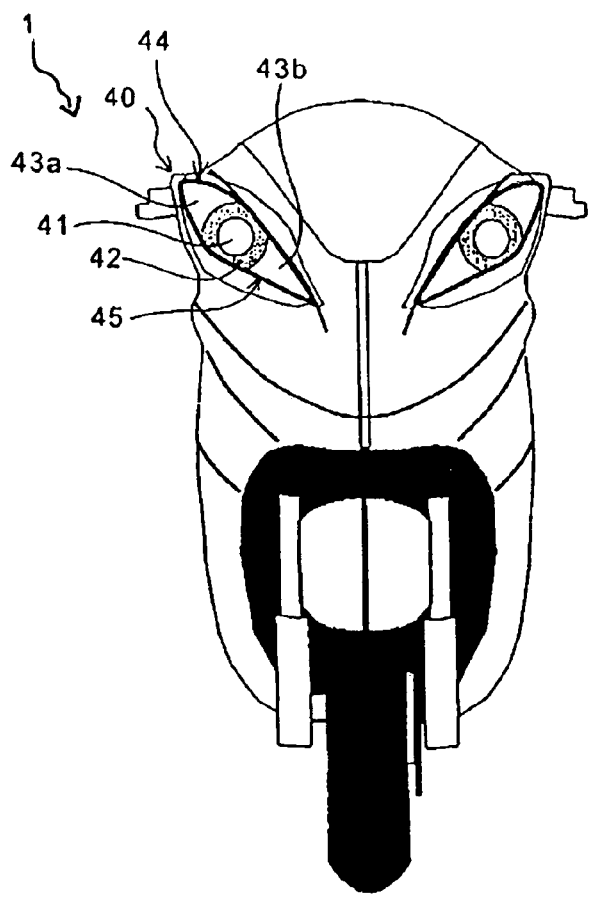
FIG.5(a)
FIG.5(b)
FIG.5(c)
FIG.5(d)

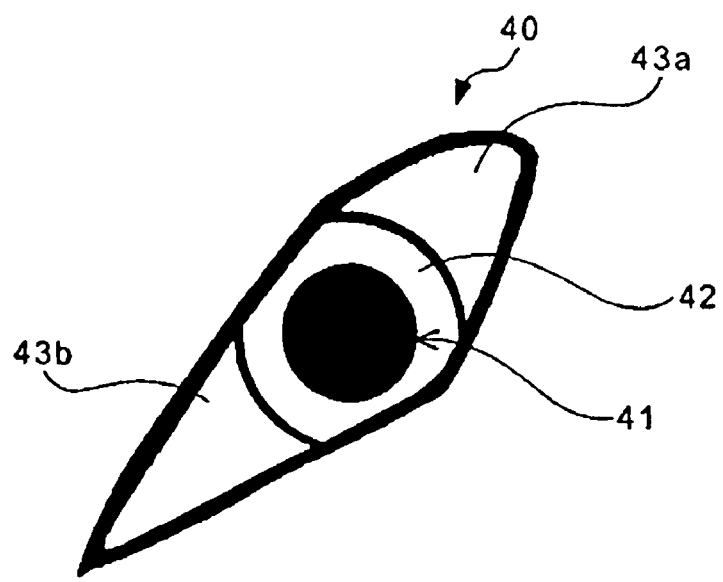
FIG.11(a)
FIG.11(b)
FIG.11(c)
FIG.11(d)

VEHICULAR LIGHTING SYSTEM

CROSS-REFERENCE TO RELATED APPLICATIONS

The present invention claims priority under 35 USC 119 based on Japanese patent application No. 2005-119789, filed on Apr. 18, 2005. The subject matter of this priority document is incorporated by reference herein.

BACKGROUND OF THE INVENTION

1. Field of the Invention

The present invention relates to a vehicular lighting system, and more specifically to a vehicular lighting system for evoking an image of a "face" by having each lighting device recognized as an "eye".

2. Description of the Background Art

Conventionally, efforts have been made to develop a technique for enhancing the visibility of a motorcycle. JP-A No. 334976/2001 below discloses lamp devices for visual recognition which are additionally provided to a head lamp normally equipped to a motorcycle. The lamp device are adapted to emit light different from that of the head lamp by methods such as flashing blue or green light or diffusing light to the surroundings using a diffusion lens. On the other hand, as an approach from the side of the driver of a four wheel car, JP-A No. 243538/1999 discloses a vehicular lighting system capable of showing a motorcycle, a pedestrian, or the like more clearly than is possible with an ordinary camera image by performing a predetermined image processing on an image of an infrared camera that shows the state of heat distribution.

Although the above-mentioned techniques exist, the easiest and the most commonly practiced technique for enhancing the visibility of a motorcycle is to perform daytime running of lights, due to problems such as vehicle production cost. However, there is a fear that the spread of such daytime running of lights to trucks or buses in recent years may cause a relative deterioration in the unique visibility of motorcycles, which has led to a search for lights enabling a further enhancement in visibility. With these circumstances as a backdrop, the present inventors have directed attention to the shape and placement of lights that directly interact with the brain of a human.

Due to recent studies on brain, the existence of a brain region (neuron) that sensitively reacts to a specific pattern is known. For monkeys, in addition to a "hand neuron" that sensitively reacts to the pattern of a hand, a "face neuron" that sensitively reacts to the pattern of a face has been reported. Further, it is becoming clear that the human also has this brain region for performing face pattern processing. In view of this, attempts have been made with regard to the visibility of a motorcycle to a human observing the motorcycle by evoking the image of a "face" on the front side of the motorcycle while taking advantage of the specific search and recognition abilities for face patterns that the human innately has. In this technique, the most important part for the expression of a "face" is "eyes". Thus, an important consideration in constructing a motorcycle that evokes the image of a "face" is how to effectively create "eyes" through appropriate placement of a headlamp or position lamp.

Now, referring to FIG. 12, an example of a conventional lighting device configuration will be described. FIG. 12(a) is a front view of a scooter type motorcycle 50. In the motorcycle 50, a front wheel WF2, which is pivotally supported to the lower end portions of front forks 52 so as to be rotatable, is steered by means of handlebars 51. The motorcycle 50 is provided with a center cowl 53 laterally covering the center of the vehicle body, and an upper cowl 54 provided on the front side of the vehicle body. A symmetrical two-lamp headlight 60 installed in the upper cowl 54 is composed of circular light-emitting potions 61 and lenses 62 having a substantially rhombic contour. Accordingly, the light emitting portion 61 can evoke the image of a pupil portion of an eye, and the contour line of the lens 62 can evoke the image of the contours of upper and lower eyelids forming a "up-slanting eye". Thus, under brightly lit environments such as in the daytime, the headlight 60 can be readily recognized as "eyes" by the observer, so the motorcycle 50 has the effect of evoking the image of a "face". However, in states where the headlight 60 is lit in the nighttime, as shown in FIG. 12(b), only the circular light-emitting portions 61 are visible. In this case, of course, the headlight 60 is not recognized as "eyes", thereby making it impossible to evoke the image of a "face".

Further, FIGS. 13(a) to 13(c) show experimentally created headlight shapes for evoking the image of a "face". FIG. 13(a) shows a case in which the entirety of the surfaces forming "eyes" is made to emit light, with the contours of the headlight being drawn substantially in the shape of up-slanting eyes. In this arrangement, however, although the headlight can be associated with "eyes", it cannot be readily distinguished from other lights. Thus the image as a "face" is formed only to some limited extent.

FIG. 13(b) shows a case in which circular light-emitting portions corresponding to pupils are provided, the light emitting portions being made to emit light together with the surfaces forming the headlight. Although this arrangement allows the headlight to be strongly recognized as "eyes" as compared with the arrangement shown in FIG. 13(a), it is difficult to distinguish between the circular light-emitting portions and the light emitting surfaces corresponding to sclera portions (whites of eyes), so the image as a "face" is formed only to a somewhat greater extent.

FIG. 13(c) shows a case in which circular light-emitting portions corresponding to pupils, and contour lines of the headlight are made to emit light. In this arrangement, the loss of the contour lines is liable to occur in the nighttime due to the occurrence of glare (a phenomenon whereby an object to be seen becomes hard to see when an extremely bright portion partially exists within the field of view) or changes in the viewing angle. In this case, only the circular light-emitting portions become visible and hence the headlight is not recognized as "eyes", so the image of a "face" is not formed.

As described above, JP-A No. 334976/2001 and JP-A No. 243538/1999 give no consideration to contrivances aimed at enhancing the visibility by evoking the image of a "face" on the front side of a motorcycle. Further, it is impossible with the conventional headlight arrangement shown in FIG. 12 to evoke the image of a "face" in the nighttime. Further, with the headlight arrangements shown in FIGS. 13(a) to 13(c), the effect of evoking the image of a "face" cannot be attained in a satisfactory manner.

The object of the present invention is solve the above-mentioned problems and provide a vehicular recognition system that evokes the image of a "face" on the front side of the motorcycle by enhancing the effect of having lights recognized as "eyes".

SUMMARY

In order to attain the above-mentioned object, according to a first aspect of the present invention, there is provided a vehicular lighting system including lighting devices arranged on a front portion of a vehicle so as to be laterally symmetrical, wherein: each of the lighting devices includes: a first portion having a circular shape; a second portion surrounding a periphery of the first portion; a third portion at least partially in contact with an outer side of the second portion, and having a shape that is elongated in a direction away from the second portion; a fourth portion arranged above the first to third portions and forming an upper contour, and a fifth portion arranged below the first to third portions and forming a lower contour; the first to third portions are surrounded by the upper contour and the lower contour respectively formed by the fourth portion and the fifth portion; and at least one of the first to fifth portions is adapted to be capable of emitting light as a lighting device.

Further, according to a second aspect of the present invention, the first portion and the third portion are each adapted to be capable of emitting light as a lighting device.

Further, according to a third aspect of the present invention, the first portion is adapted to function as a headlight, and the third portion is adapted to function as a position light.

Further, according to a fourth aspect of the present invention, the first portion, the fourth portion, and the fifth portion are each adapted to be capable of emitting light as a lighting device.

Further, according to a fifth aspect of the present invention, the second portion and the third portion are each adapted to be capable of emitting light as a first lighting device, and the vehicular lighting system further includes a second lighting device provided below the lighting devices.

Further, according to a sixth aspect of the present invention, the second lighting device has both its ends closed in a tapered fashion.

Further, according to a seventh aspect of the present invention, the second lighting device is adapted to function as a headlight, and the second portion and the third portion are each adapted to function as a position light.

Further, according to an eighth aspect of the present invention, the first portion is a convex lens of a projector type light, and the third portion emits light by means of leakage light of the projector type light guided by a light guide plate.

Further, according to a ninth aspect of the present invention, the first portion is a convex lens of a projector type light, and the third portion emits light by means of light emitting diodes.

Further, according to a tenth aspect of the present invention, the third portion has white light emitting diodes and yellow light emitting diodes arranged thereon, and the yellow light emitting diode is adapted to function as a turn signal.

Further, according to an eleventh aspect of the present invention, two connecting portions between the fourth portion and the fifth portion are formed in a center direction of the vehicle and in an outer direction of the vehicle, respectively.

Further, according to a twelfth aspect of the present invention, an angle formed by a perpendicular line and a line segment connecting between the two connecting portions satisfies 45 degrees<$\alpha$<90 degrees.

Further, according to a thirteenth aspect of the present invention, with respect to a line segment connecting between the two connecting portions, a center of each of the first portion and the second portion is at a position shifted toward the fourth portion including a position on the line segment.

According to the first through fourth aspects of the invention, the contrast between the pupil portion and the sclera portion becomes clear due to the iris portion, thereby allowing the lighting devices to be strongly recognized as "eyes" by the observer. This makes it possible to effectively evoke the image of a "face" on the front side of the motorcycle not only in a lit environment such as in the daytime but also in the nighttime.

According to the fifth through seventh aspects of the invention, in addition to the lighting devices that evoke the image of "eyes", a second lighting device that evokes the image of a "mouth" is provided, whereby the image of a face can be evoked even more effectively.

According to the eight aspect of the invention, the pupil portion and the sclera portion can be made to emit light at the same time by means of a simple construction and using the same light source.

According to the ninth aspect of the invention, a light guide plate for guiding light from a projector type light become unnecessary, whereby the freedom of layout of the lighting devices can be enhanced.

According to the tenth aspect of the invention, there is no need to separately provide a turn signal, whereby the degree of design of the front side of the vehicle body can be enhanced.

According to the eleventh and twelfth aspect of the invention, each lighting device can be installed at a position allowing the image of a "face" to be effectively evoked.

According to the thirteenth aspect of the invention, the line of sight from the "eyes" of the lighting devices faces the front, whereby the recognition of the lighting devices as "eyes" is enhanced so that the image of a "face" can be evoked even more effectively.

Modes for carrying out the present invention are explained below by reference to an embodiment of the present invention shown in the attached drawings. The above-mentioned object, other objects, characteristics and advantages of the present invention will become apparent form the detailed description of the embodiment of the invention presented below in conjunction with the attached drawings.

BRIEF DESCRIPTION OF THE FIGURES

FIGS. 4a, 4b, 4c and 4d are schematic explanatory drawings showing changes in appearance when the lighting locations in a lighting device are varied.

FIGS. 5a, 5b, 5c and 5d are schematic explanatory drawings of a vehicular lighting system according to a second embodiment of the present invention.

FIGS. 11a-11d are schematic explanatory drawings showing differences in appearance when the circumferential thickness of the ring is varied in the lighting device according to the first embodiment.

DETAILED DESCRIPTION OF THE INVENTION

A selected illustrative embodiment of the invention will now be described in some detail, with reference to the drawings. It should be understood that only structures considered necessary for clarifying the present invention are described herein. Other conventional structures, and those of ancillary and auxiliary components of the system, are assumed to be known and understood by those skilled in the art.

Figure 1:
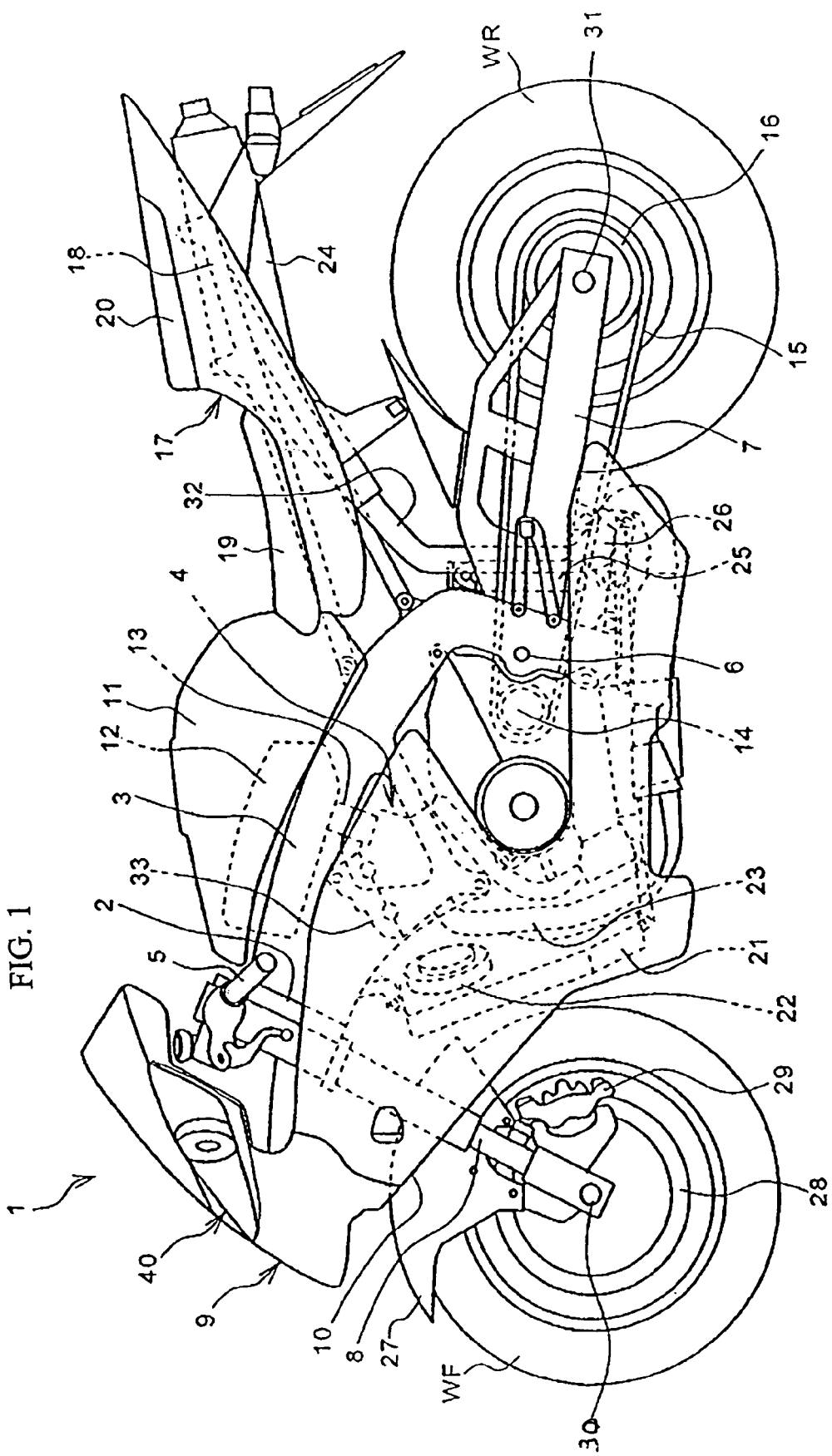
FIG. 1 is a side view of an embodiment of a motorcycle to which the present invention is applied.

FIG. 1 is a side view of an embodiment of a motorcycle to which the present invention is applied. In a motorcycle 1, a pair of right and left main frames 3 extend diagonally downward toward the rear of the vehicle body from a head pipe 2, and a parallel 4-cylinder engine 4 is mounted below the main frames 3. A swing arm 7 is pivotally supported on a lower rear portion of the main frames 3 via a pivot shaft 6 so as to be vertically swingable. The upper end of a rear cushion 25 is mounted to an upper front portion of the swing arm 7, and the lower end of the rear cushion 25 is supported on a lower portion of the main frames 3 via a link work 26. A rear wheel WR, which is rotated by the drive force transmitted by means of a chain 15 and a driven sprocket 16 from a drive sprocket 14 mounted to an output shaft of the engine 4, is pivotally supported on an axle 31 at the rear end of the swing arm 7 in a rotatable manner.

A pair of right and left front forks 8 are rotatably attached to the head pipe 2 so as to be steerable by handlebars 5. Below a front fender 27, a front wheel WF is pivotally supported on an axle 30 so as to be rotatable. A brake disc 28, which rotates integrally with the front wheel WF, performs deceleration control on the motorcycle 1 using the frictional force that is generated when the brake disc 28 is sandwiched by a brake caliper 29. Disposed inside a fuel tank 11 mounted above the main frames 3 is an air cleaner box 12 connected to an intake manifold 13. Mounted in rear and above the main frames 3 is a seat frame 18 for supporting a seat cowl 17 including a seat 19 and a rear seat 20. A radiator 21 including an electric fan 22 for cooling is provided in front of the engine 4 within the vehicle body, and four exhaust pipes 23 connected to an exhaust port of a cylinder head 33 are disposed between the engine 4 and the radiator 21. The four exhaust pipes 23 converge into a single pipe in a lower portion of the engine 4 before being guided by means of a collecting pipe 32 to a silencer 24 accommodated in a lower portion of the seat cowl 17. A vehicular lighting system according to the present invention is applied to a headlight 40 provided to an upper cowl 9 in front of a center cowl 10.

Figure 2:
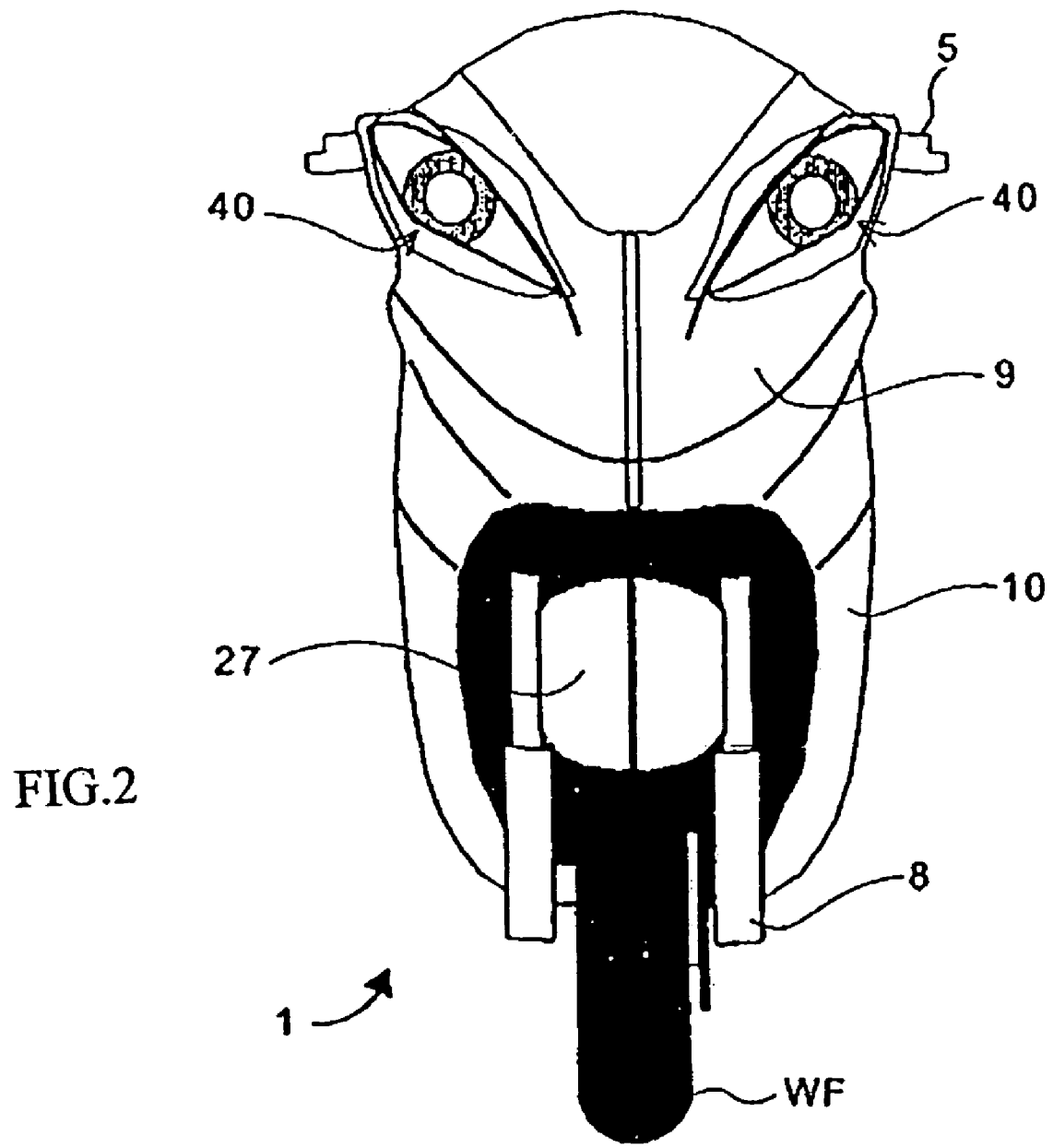
FIG. 2 is a front view of an embodiment of a motorcycle to which the present invention is applied.

FIG. 2 is a front view of an embodiment of a motorcycle to which the present invention is applied. Reference numerals that are the same as those described above denote the same or equivalent portions. Headlights 40 as symmetrical lighting devices are provided in an upper portion of the upper cowl 9 of the motorcycle 1. As described above, the purpose of the present invention is to have the headlights 40 recognized as "eyes" by an observer, thereby effectively evoking the image of a "face" on the front side of the motorcycle 1.

Figure 3A:
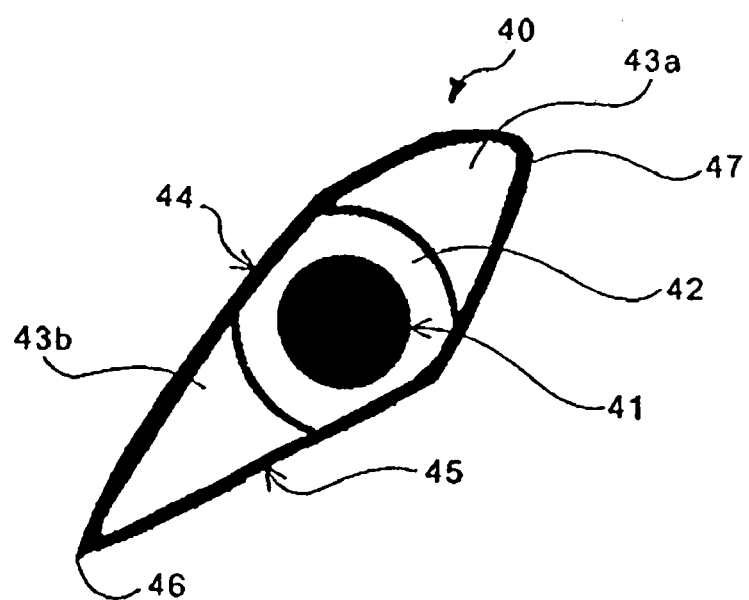
FIGS. 3a and 3b are schematic explanatory drawings of a vehicular lighting system according to a first embodiment of the present invention.
Figure 3B:
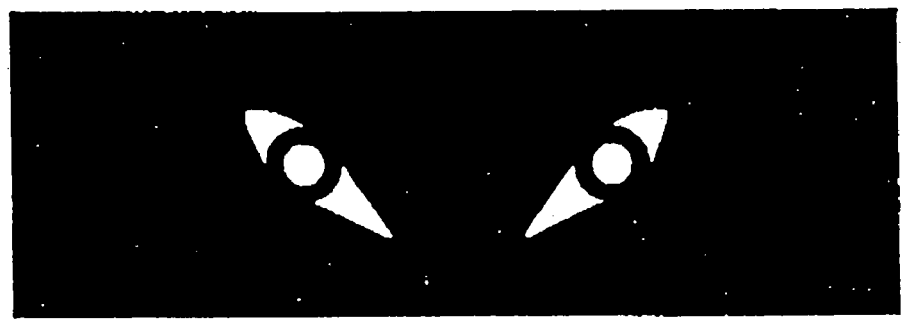

FIG. 3(a) is an enlarged view of the headlight 40, and FIG. 3(b) is a schematic drawing showing how the headlights 40 according to this embodiment is seen in the nighttime. In FIG. 3(a), the headlight 40 has a ring 42 as a second portion provided on the outer peripheral side of a main light 41 as a first portion. Further, plates 43a, 43b each serving as a third portion are provided between the ring 42 and each of an upper frame 44 as a fourth portion and a lower frame 45 as a fifth portion. In addition, at the connecting points between the upper frame 44 and the lower frame 45, an inner canthus portion 46 and an outer canthus portion 47 are formed on the center side and on the outer side, respectively, of the vehicle body. Due to the foregoing arrangement, the main light 45, the ring 42, the plates 43a, 43b, the upper frame 44, and the lower frame 45 express "pupil", "iris", "sclera", "upper eye lid", and "lower eye lid", respectively, which means that the headlights 40 have the same configuration as "eyes" and thus can be readily recognized as "eyes" by the observer.

Further, in this embodiment, the main light 41 and the plates 43a, 43b are made to emit light as a headlamp, whereas the ring 42 is non-light emitting. Accordingly, as shown in FIG. 3(b), even in the nighttime, there is provided an effect in that the "iris" that is not emitting light serves to further accentuate the presence of the "pupil". Thus, even in the nighttime, the headlights 41 can be strongly recognized as "eyes", which make it possible to effectively evoke the image of a "face" on the front side of the motorcycle. While the structure of the headlight 40 will be described later, for example, in addition to forming the main light 41 using a projector type light, the plates 43a, 43b, the ring 42, and the upper frame 44 and the lower frame 45 can be respectively composed of a reflector plate having a plurality of light-emitting diodes arranged thereon, an acrylic structure that emits light in its entirety with light emitting diodes as the light source, and a line of light emitting diodes or the like.

Further, the headlight 40 constructed as described above allows the impression it gives to the observer to be significantly changed by varying the sizes, configurations, or positional relations of the respective structural components thereof.

FIG. 4 are schematic explanatory drawings showing changes in appearance when the lighting locations are varied in the vehicular lighting system according to the first embodiment of the present invention as described above. Reference numerals that are the same as those described above denote the same or equivalent portions. As shown in FIGS. 4(a) and 4(b), when the main light 41 and the plates 43a, 43b are lit, it is possible, as described above, to evoke the image of a "face" on the front side of the motorcycle not only under a brightly lit environment such as daytime but also in the nighttime. However, when only the main light 41 and the plate 43b are lit as shown in FIG. 4(c), or when only the main light 41 and the plate 43a are lit as shown in FIG. 4(d), there is a lack of elements constituting "eyes", causing a marked reduction in the effect of evoking the image of a "face".

FIG. 5(a) is a front view of a motorcycle to which a vehicular lighting system according to a second embodiment of the present invention is applied. Reference numerals that are the same as those described above denote the same or equivalent portions. In this embodiment, the lighting locations of the headlight 40 are set as the main light 41, and the upper frame 44 and the lower frame 45. As a result, as shown in FIG. 5(b), the contour portions of "eye" emit light, and also the plates 43a, 43b corresponding to "sclera" are dimly lit. The contours of the "eye" and the position of the "pupil" thus become clear, thereby making it possible to effectively evoke the image of a "face" on the front side of the motorcycle even in the nighttime. In contrast, as shown in FIG. 5(c), when only the main light 41 and the plate 43b are lit, and as shown in FIG. 5(d), when only the main light 41 and the plate 43a are lit, there is a lack of elements constituting "eyes", causing a marked reduction in the effect of evoking the image of a "face".

Figure 6C:
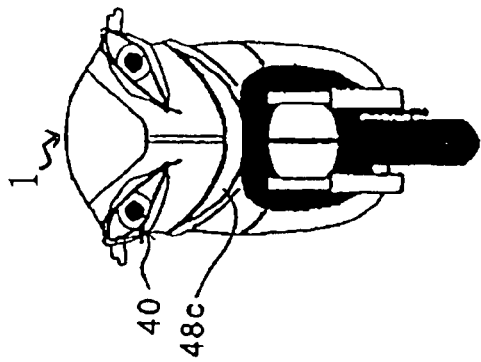
FIGS. 6a-6e are schematic explanatory drawings of a vehicular lighting system according to a third embodiment of the present invention.
Figure 6E:
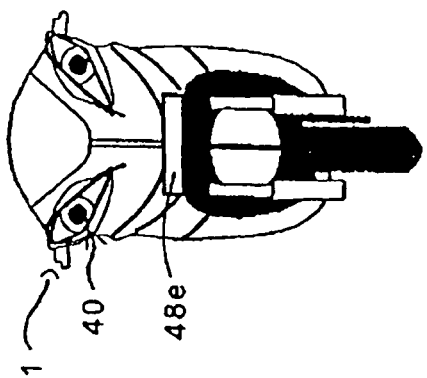
Figure 6B:
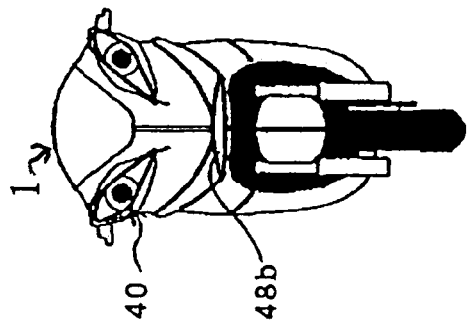
Figure 6D:
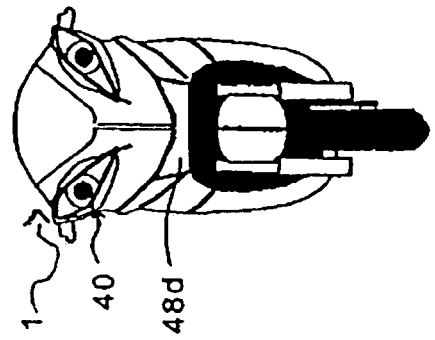
Figure 6A:
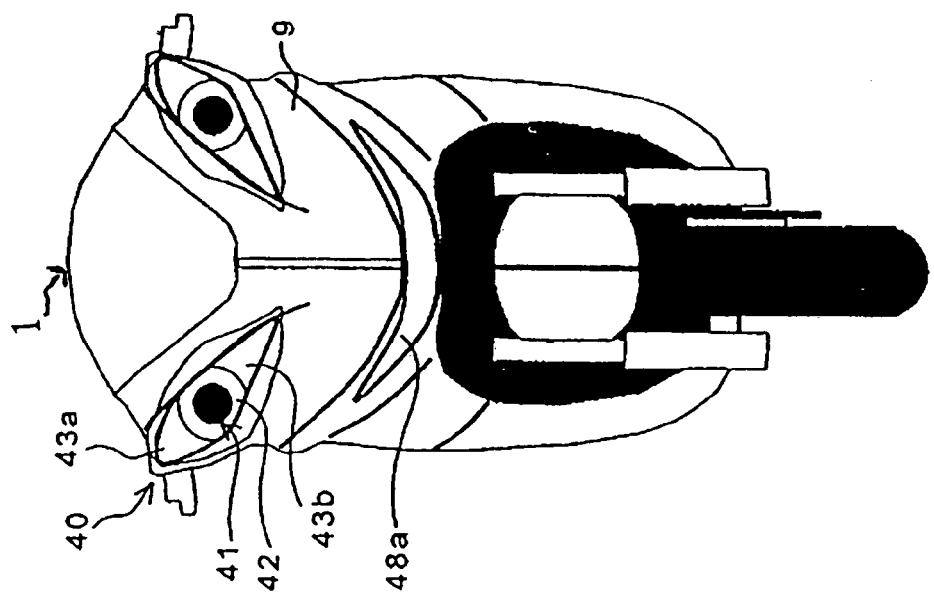

FIG. 6(a) is a front view of a motorcycle to which a vehicular lighting system according to a third embodiment of the present invention is applied. Reference numerals that are the same as those described above denote the same or equivalent portions. In this embodiment, the lighting locations of the head light 40 are set as the ring 42 and the plates 43a, 43b only, and the portion of the main light 41 does not emit light. This arrangement imparts the headlight 40 with the function as a position light. In addition, an underlight 48a functioning as a main headlamp is provided to the upper cowl 9 below the headlights 40. According to the above-described construction, the underlight 48a, which has a configuration in which its both ends are closed in a tapered fashion, can be associated with a "mouth" in addition to the "eyes" of the headlights 40, leading to marked enhancement in the effect of evoking the image of a "face" on the front side of the motorcycle. The underlight 48 preferably has a configuration in which its both ends are closed in a tapered fashion as indicated at 48b in FIG. 6(b) and 48c in FIG. 6(c). Further, indicated at 48d in FIG. 6(d) and 48e in FIG. 6(e) are examples of configuration that do not readily evoke the image of a "mouth" because both ends thereof are not closed in a tapered fashion.

Figure 7:
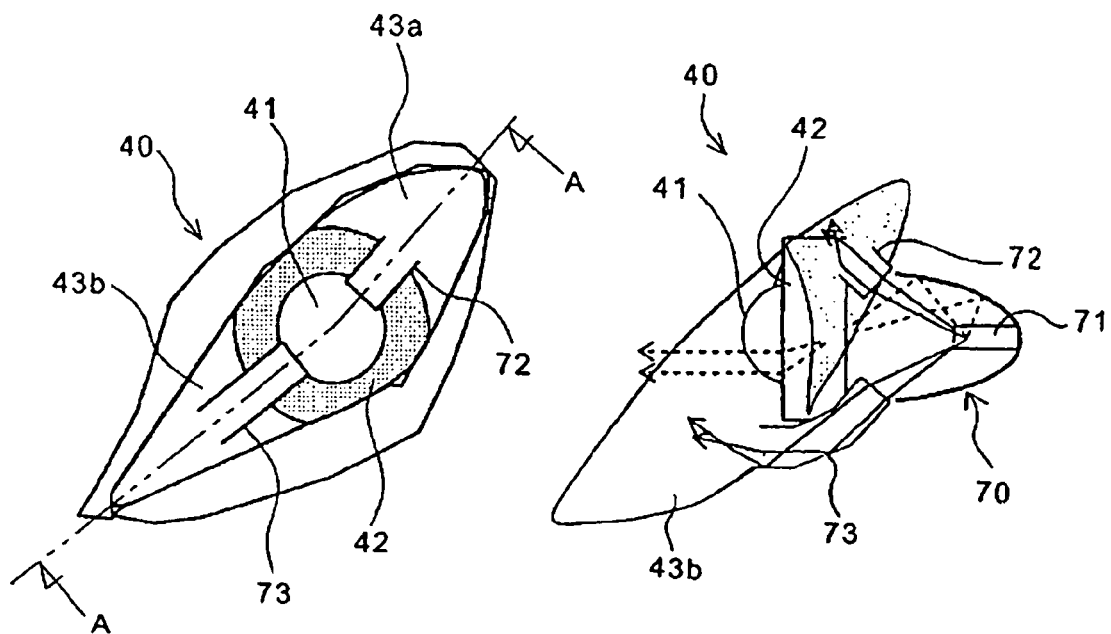
FIGS. 7a and 7b are a front view and a sectional view, showing an embodiment of the structure of a lighting device.

FIG. 7 show embodiments of the structure of the headlight 40. FIG. 7(a) is a front view of the headlight 40, and FIG. 7(b) is a sectional view taken along the line A-A of FIG. 7(a). Reference numerals that are the same as those described above denote the same or equivalent portions. This structural example is applied to the case where the main light 41 and the plates 43a, 43b are made to emit light. The main light 41 used is that of a known projector type in which light rays emitted by a light source 71 are gathered by a reflector 70 and irradiated through a convex lens having a focal point located at the same position. Arranged on the back sides of the plates 43a, 43b are light guide plates 72, 73 for guiding in an arbitrary direction leakage light that cannot be gathered by the reflector 70. The surfaces of the plates 43a, 43b emit light due to the light thus guided. Further, in order to diffuse light to achieve surface light emission, the surfaces of the plates 43a, 43b are coated with frosting or translucent coloring. Further, the surface of the ring 42, which is non-light emitting, may be subjected to frosting so that it does not reflect light from the surroundings.

Figure 8:
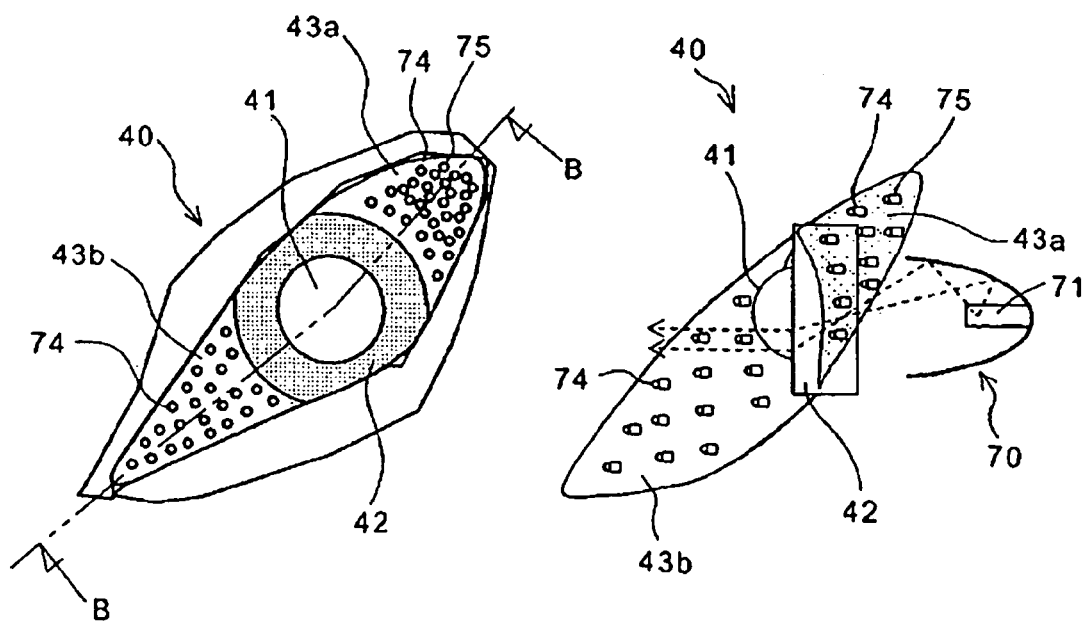
FIGS. 8a and 8b are a front view and a sectional view, showing a modification of the embodiment of the structure of the lighting device.

FIG. 8 show modifications of the structure of the headlight 40. FIG. 8(a) is a front view of the headlight 40, and FIG. 8(b) is a sectional view taken along the line B-B of FIG. 8(a). Reference numerals that are the same as those described above denote the same or equivalent portions. The structure of this modification is applied to the case where the main light 41 and the plates 43a, 43b are lit. In this modification as well, the main light 41 used is that of a projector type. However, the light guide plates used in the structural example shown in FIG. 7 are done away with, and the light emission of the plates 43a, 43b is accomplished by means of a plurality of white light-emitting diodes (LED) 74 arranged on the respective surfaces thereof. Further, an appropriate number of yellow LEDs are arranged on the plate 43a, the yellow LEDs being used as turn signals. According to this modification, the light guide plates become unnecessary, thereby making it possible to enhance the freedom of layout of the headlight 40. Further, the turn signals need not to be provided separately, whereby the freedom of design of the front side of the vehicle body can be enhanced.

Figure 9:
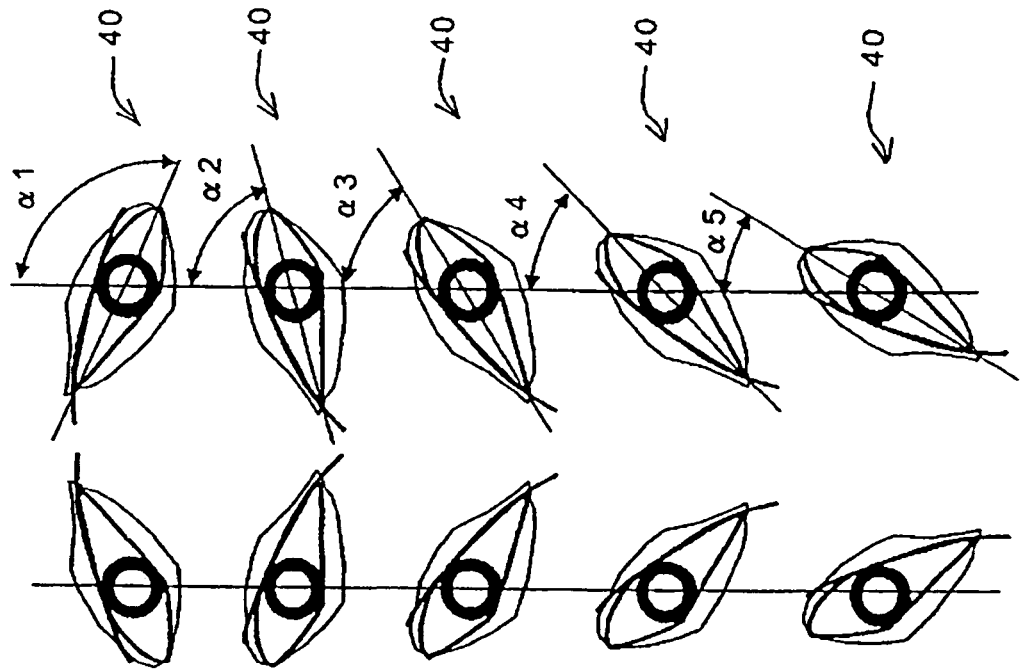
FIGS. 9a and 9b are schematic explanatory drawings showing differences in appearance when the placement angle of a lighting device according to the first embodiment is varied.
Figure 9:
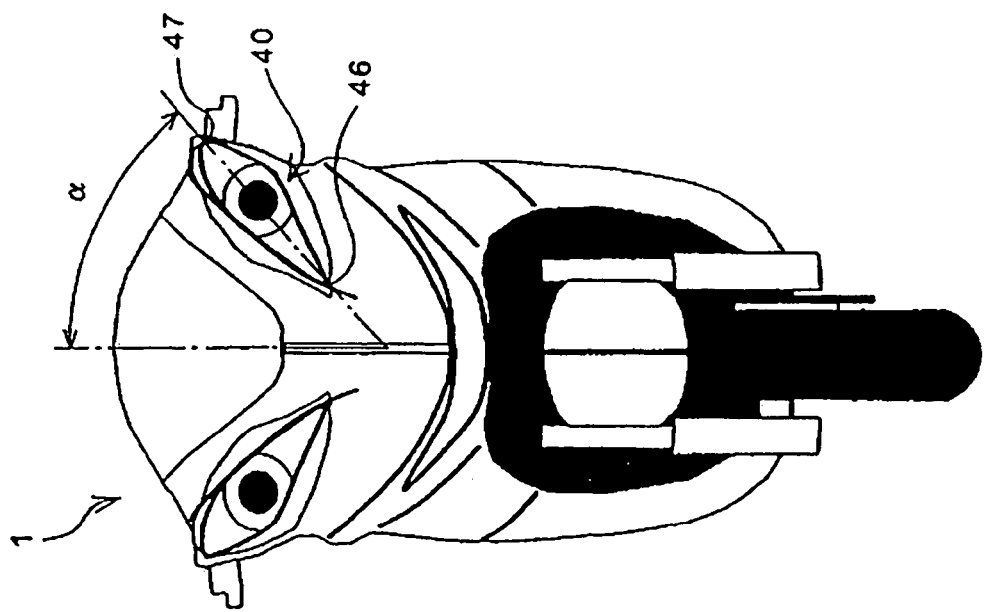

FIG. 9 are schematic explanatory drawings showing changes in appearance when the degree of so-called "up-slanting eye" is varied in the vehicular lighting system according to the first embodiment of the present invention as described above. Reference numerals that are the same as those described above denote the same or equivalent portions. In the front view of FIG. 9(a), an angle α formed by a vertical line which bisects the left and right headlight and the line segment connecting between the inner canthus portion 46 and the outer canthus portion 47 is about 50 degrees, whereby the front side of the motorcycle 1 is highly likely to evoke the image of a "face". FIG. 9(b) shows respective outward appearances in the case where the angle α is changed in 5 levels from α1 of about 110 degrees to α5 of about 30 degrees. Herein, in order to have the headlight 40 recognized as "eye", it proves highly effective to set the angle α within the range of 45 to 90 degrees. In FIG. 9(b), α2 (about 75 degrees), α3 (about 60 degrees), and α4 (about 45 degrees) meet this condition, and it is confirmed through experiment that the effect of evoking the image of a "face" decreases at α1 or α5.

Figure 10A:
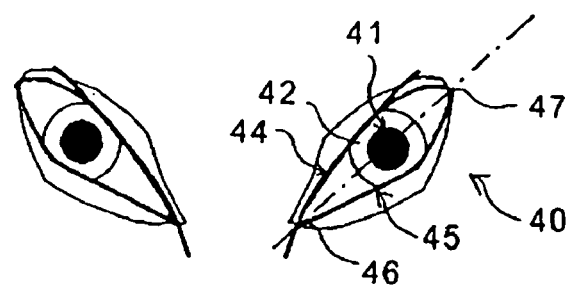
FIGS. 10a, 10b, and 10c are schematic explanatory drawings showing differences in appearance when the placements of a main light and of a ring are varied in the lighting device according to the first embodiment.
Figure 10B:
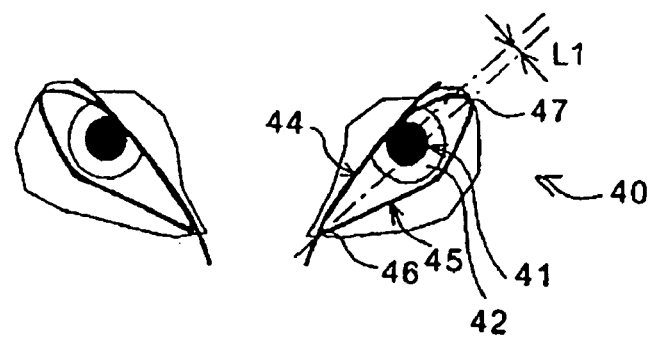
Figure 10C:
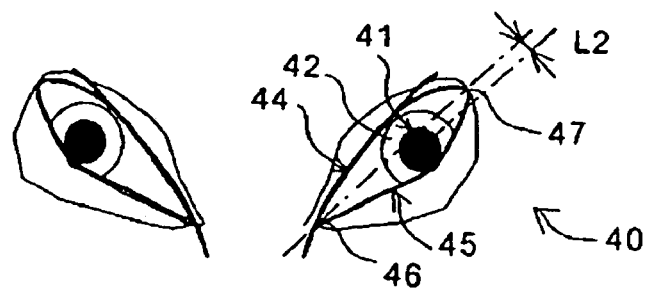
Figure 12:
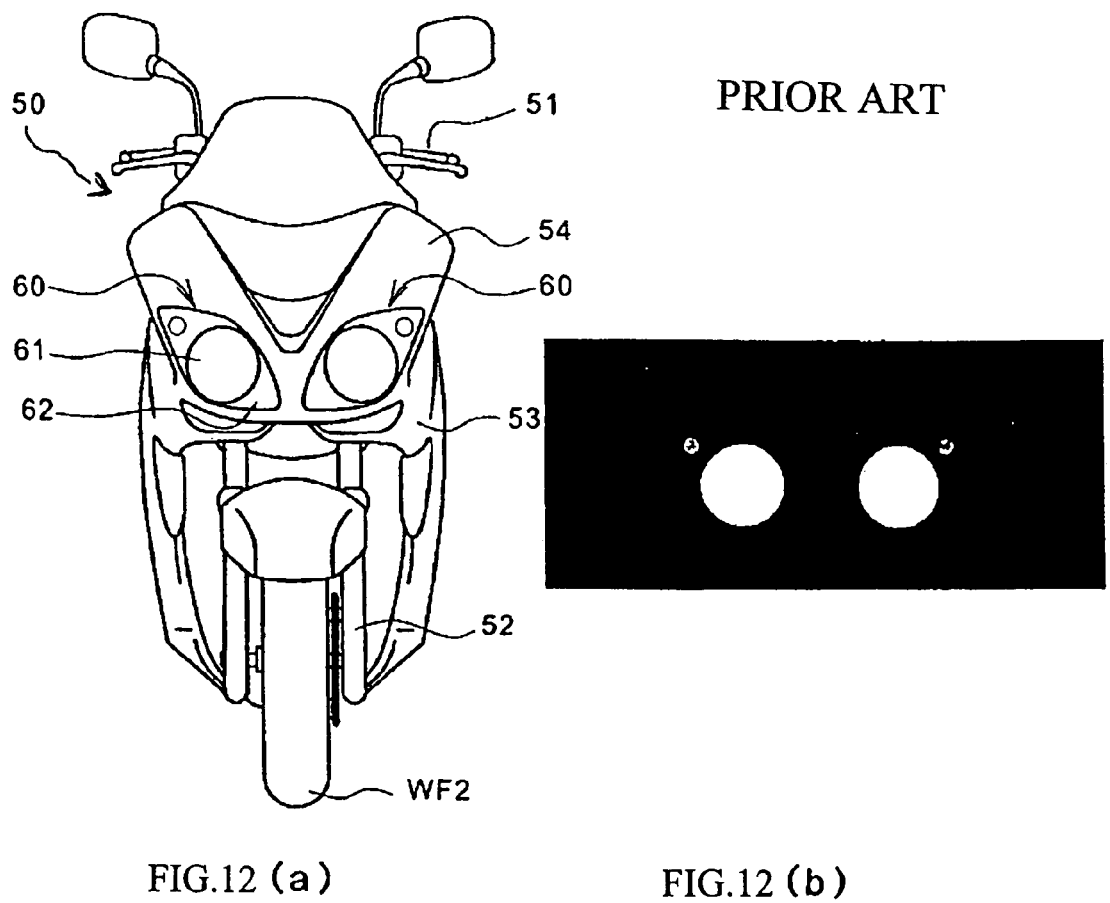
FIG. 12 is a schematic explanatory drawings of a conventional lighting device.
Figure 13:
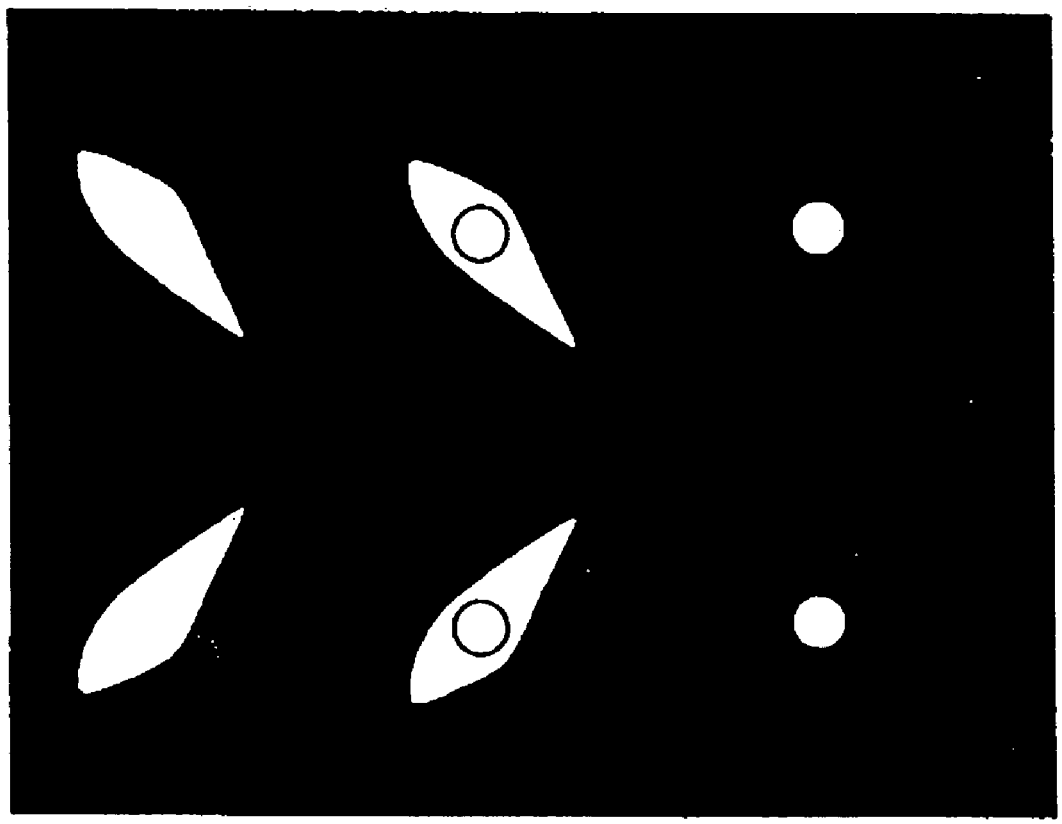
FIGS. 13a, 13b, and 13c are schematic explanatory drawings showing the appearances of experimentally created lights in the nighttime.

FIG. 10 are schematic explanatory drawings showing differences in appearance when the positions of the main light 41 and of the ring 42 are moved relative to the upper frame 44 and the lower frame 45 in the vehicular lighting system according to the first embodiment of the present invention as described above. Reference numerals that are the same as those described above denote the same or equivalent portions. FIG. 10(a) shows a state in which the centers of the main light 41 and ring 42 are placed on the line segment connecting between the inner canthus portion 46 and the outer canthus portion 47. Further, FIG. 10(b) shows a state in which the centers of the main light 41 and ring 42 are moved to the upper frame 44 side (by, for example, a distance L1) relative to the same line segment as described above. When the main light 41 and the ring 42 are placed as shown in FIGS. 10(a) and 10(b), the line of sight from the "eye" is facing to the front, whereby the effect of giving the impression of "being seen" to the observer enhances to further enhance the recognition as "eye". In the case of FIG. 10(b), in particular, since the main light 41 and the ring 42 are partially hidden by the upper frame 44, a gaze of upward glace is formed, thereby making it possible to evoke the image of a "glare" or "angry face". In contrast, when, as shown in FIG. 10(c), the centers of the main light 41 and ring 42 are moved to the lower frame 45 side (by, for example, a distance L2) relative to the line segment connecting between the inner canthus portion 46 and the outer canthus portion 47, the line of sight from the "eye" cannot evoke the image of "eyes" gazing toward the front, so the recognition as "eye" deteriorates.

FIG. 11 are schematic explanatory drawings showing differences in appearance when the circumferential thickness of the ring 42 is varied in the vehicular lighting system according to the first embodiment of the present invention as described above. With the headlight 40 shown in FIG. 11(a), the main light 41 and the plates 43a, 43b are made to emit light, and the ring 42 located therebetween is non-light emitting. Thus the contrast becomes clear, whereby the "pupil" and "sclera" can be positively discriminated from each other. At this time, since it is the ring 42 that largely affects the expression of the "eye", the expression of the "eye" can be changed by varying the circumferential thickness thereof. FIGS. 11(b) through 11(d) show changes in appearance in the nighttime due to variations in the thickness of the ring 42. In the illustrated example, the visibility with respect to the observer can be enhanced when the ring 42 is thick as shown in FIG. 11(b) as opposed to when the ring 42 is thin as shown in FIG. 11(d).

As described above, according to the present invention, the lighting device can be strongly recognized as "eyes" not only in a lit environment such as in the daytime but also in the nighttime, whereby the image of a "face" can be readily evoked on the front side of the motorcycle. While a working example of the present invention has been described above, the present invention is not limited to the working example described above, but various design alterations may be carried out without departing from the present invention as set forth in the claims.

What is claimed is:

1. A vehicular lighting system comprising a pair of laterally symmetrical lighting devices arranged on a front portion of a vehicle, wherein each of the lighting devices includes:
    a first portion having a circular shape;
    a second portion surrounding a periphery of the first portion;
    a third portion comprising an upper portion and a lower portion, the upper portion at least partially in contact with an outer side of the second portion and the lower portion at least partially in contact with an inner side of the second portion, the upper portion and the lower portion each having a shape that is elongated in a direction away from the second portion;
    a fourth portion arranged above the first, second, and third portions, the fourth portion forming an upper contour member; and
    a fifth portion arranged below the first, second, and third portions, the fifth portion forming a lower contour member;
    wherein the first, second, and third portions are substantially fully surrounded by the upper contour member and the lower contour member respectively formed by the fourth portion and the fifth portion, such that the upper contour member and the lower countour member converge to form an inner canthus portion on an inner side of the lower portion of the third portion, and an outer canthus portion on an outer side of the upper portion of the third portion;
    wherein at least one of the first, second, third, fourth, and fifth portions emits light and functions as a vehicle headlight; and
    wherein the pair of lighting devices is configured and arranged to resemble a pair of eyes when viewed from a position in front of the vehicle.

2. The vehicular lighting system according to claim 1, wherein:
    a powered light source is attached to the vehicular lighting system at a rear side of the first portion such that the powered light source is proximately rearwardly aligned with the first portion and the second portion, wherein the powered light source is disposed at a bottom center of a reflective inside surface of a substantially conical-shaped light housing; and
    the first portion and the third portion each emit light generated by the powered light source and reflected outwardly by the reflective inside surface of the light housing.

3. The vehicular lighting system according to claim 2, wherein:
    the first portion is a convex lens of a projector type light; and
    the third portion emits leakage light of a projector type guided by a light guide plate arranged on a rear side of each of the upper portion and the lower portion of the third portion, wherein the light guide plate longitudinally extends rearwardly toward the powered light source.

4. The vehicular lighting system according to claim 2, wherein:
    the first portion is a convex lens of a projector type light; and
    the third portion emits light of a light emitting diode.

5. The vehicular lighting system according to claim 4, wherein:
    the third portion has a white light emitting diode and a yellow light emitting diode arranged thereon; and
    the yellow light emitting diode is a turn signal.

6. The vehicular lighting system according to claim 2, wherein:
    the first portion functions as a headlight; and
    the third portion functions as a position light.

7. The vehicular lighting system according to claim 6, wherein:
    the first portion is a convex lens of a projector type light; and
    the third portion emits leakage light of a projector type guided by a light guide plate.

8. The vehicular lighting system according to claim 6, wherein:
    the first portion is a convex lens of a projector type light; and
    the third portion emits light of a light emitting diode.

9. The vehicular lighting system according to claim 8, wherein the third portion has a white light emitting diode and a yellow light emitting diode arranged thereon; and the yellow light emitting diode is a turn signal.

10. The vehicular lighting system according to claim 1, wherein the first portion, the fourth portion, and the fifth portion each emit light and collectively function as a vehicle headlight.

11. The vehicular lighting system according to claim 1, wherein:
    the second portion and the third portion each emit light and collectively function as a vehicle headlight; and
    the vehicular lighting system further comprises a second lighting device provided below the lighting devices, wherein the second lighting device extends laterally and rearwardly, and the second lighting device is symmetrical with respect to a center of the front portion of the vehicle.

12. The vehicular lighting system according to claim 11, wherein the second lighting device comprises opposed ends which are each laterally and outwardly tapered to a point such that the second lighting device resembles a mouth.

13. The vehicular lighting system according to claim 12, wherein:
    the second lighting device functions as a headlight; and
    the second portion and the third portion each function as a position light.

14. The vehicular lighting system according to claim 1, wherein the fourth portion comprises opposed ends, and one of the opposed ends is disposed in a center direction of the vehicle, the other of the opposed ends is disposed in an outer direction of the vehicle, and the fourth portion is directly connected to the fifth portion at each of the opposed ends.

15. The vehicular lighting system according to claim 14, wherein the vehicular lighting system comprises two lighting devices arranged laterally symmetrically about a bisecting line; and wherein an angle α formed between the bisecting line and a line segment connecting the opposed ends lies in the range of 45 degrees <α<90 degrees.

16. The vehicular lighting system according to claim 14, wherein a center of each of the first portion and the second portion is arranged at one of a position on a line segment connecting the opposed ends, and a position shifted toward the fourth portion with respect to the line segment connecting the opposed ends.

17. The vehicular lighting system according to claim 1, wherein the first-fifth portions of each of said lighting devices cooperate to evoke an image of an eye when viewed from the front portion of the vehicle, with the first portion corresponding to a pupil, the second portion corresponding to an iris, and the third portion corresponding to a sclera.

18. The vehicular lighting system according to claim 1, wherein the second portion defines a dark area between the first and third portions, and fourth and fifth portions define a darkened area substantially fully surrounding the first-third portions.

19. A vehicular lighting system comprising a pair of laterally symmetrical lighting devices arranged about a bisecting line on a front portion of a vehicle, wherein each of the lighting devices includes:
- a first portion having a substantially circular shape;
- a second portion substantially surrounding a periphery of the first portion;
- a third portion comprising an upper portion and a lower portion, the upper portion at least partially in contact with an outer side of the second portion and the lower portion at least partially in contact with an inner side of the second portion, the upper portion and the lower portion each having a shape that is elongated in a direction away from the second portion;
- a fourth portion arranged above the first, second, and third portions, the fourth portion forming an upper contour member; and
- a fifth portion arranged below the first, second, and third portions, the fifth portion forming a lower contour member;
- wherein the first, second and third portions are surrounded by the upper contour member and the lower contour member respectively formed by the fourth portion and the fifth portion, and at least one of the first, second, third, fourth, and fifth portions emits light and functions as a vehicle headlight;
- the fourth portion comprises opposed ends connected to the fifth portion at each of the opposed ends;
- wherein an angle α formed between the bisecting line and a line segment connecting the opposed ends lies in the range of 45 degrees <α<90 degrees; and
- wherein the pair of lighting devices is configured and arranged to resemble a pair of eyes when viewed from a position in front of the vehicle.

20. A vehicular lighting system comprising two laterally symmetrical lighting devices arranged on a front portion of a vehicle, wherein each of the lighting devices includes:
- a first, substantially central portion having a substantially circular shape;
- a second portion surrounding a periphery of the first portion;
- a third portion comprising an upper portion and a lower portion, the upper portion at least partially in contact with an outer side of the second portion and the lower portion at least partially in contact with an inner side of the second portion, the upper portion and the lower portion each having a shape that is elongated in a direction away from the second portion and includes an end having edges which taper toward one another as the end extends away from the second portion;
- a fourth portion arranged above the first, second, and third portions, the fourth portion forming an upper contour member; and
- a fifth portion arranged below the first, second, and third portions, the fifth portion forming a lower contour member;
- wherein the first, second and third portions are substantially fully surrounded by the upper contour member and the lower contour member respectively formed by the fourth portion and the fifth portion, and at least one of the first, second, and third portions is operable to emit light and to function as a vehicle headlight; and
- wherein the lighting devices are configured and arranged to resemble a pair of eyes when viewed from a position in front of the vehicle.

* * * * *